United States Patent [19]
Anichini et al.

[11] 3,958,338
[45] May 25, 1976

[54] GAUGE WITH ELECTRIC POSITION TRANSDUCERS TO MEASURE THE SIZES OF MECHANICAL WORKPIECES

[75] Inventors: Cesare Anichini, Firenze; Mario Possati, Bologna, both of Italy

[73] Assignee: Finike Italiana Marposs-Soc. In Accomandita Semplice di Mario Possati & C., Bentivoglio, Italy

[22] Filed: Aug. 28, 1974

[21] Appl. No.: 501,271

[30] Foreign Application Priority Data
Sept. 7, 1973  Italy................... 3494/73

[52] U.S. Cl............................... 33/178 E; 33/143 L
[51] Int. Cl.².......................................... G01B 7/12
[58] Field of Search............ 33/178 E, 1 H, DIG. 5, 33/147 L, 143 L, 147 N, 148 H, 149 J, 178 F, 147 K, 178 R

[56] References Cited
UNITED STATES PATENTS

| | | | |
|---|---|---|---|
| 2,534,632 | 12/1950 | Smith | 33/147 N X |
| 2,640,271 | 6/1953 | Boucher | 33/174 L |
| 2,674,046 | 4/1954 | Kaye | 33/147 K |
| 3,821,856 | 7/1974 | Rapp | 33/178 E |

Primary Examiner—Richard E. Aegerter
Assistant Examiner—Michael H. Thaler
Attorney, Agent, or Firm—Stevens, Davis, Miller & Mosher

[57] ABSTRACT

A gauge for measuring the sizes of mechanical workpieces including a support frame, movable feelers adapted to touch the work to be measured, a flexible lamina associated with the feelers, electrical position transducers having displaceable movable elements, at least one inextensible axially movable wire connecting the lamina to the movable elements of the transducer. The movement of the feelers in turn move the lamina, wire and movable transducer element whereby an output signal is generated responsive to the axial position of the wire.

7 Claims, 6 Drawing Figures

GAUGE WITH ELECTRIC POSITION TRANSDUCERS TO MEASURE THE SIZES OF MECHANICAL WORKPIECES

This invention relates to a gauge with electrical position transducers adapted to check the sizes of mechanical workpieces with a high degree of precision. In particular, the invention relates to a direct feeling gauge fitted with a mobile element being very simple, light and of small dimension.

It is known that gauges with direct feeling and electric transducers generally include rigid arms which can revolve around pivots of fulcra bearing feelers. The feelers are apt to touch the piece to be gauged.

The displacements of the moving arms are transmitted through connecting elements, such as rigid transmission levers and possibly intermediate gears, to one or more mobile armatures of electric position transducers supplying output signals depending on the position of the feelers.

Some of the disadvantages of these gauges consist in the complexity, bulk and weight of the connecting elements.

In particular, the manufacturing of the gauges is difficult, if not impossible, when the sizes to be gauged are very small or it is required to contemporarily carry out several size checks on the same part of a piece.

To gauge diameters of holes or other internal sizes there are often used gauges formed by an external protection ogival plug adapted to be introduced into the hole with a little backlash.

The devices really detecting the measures are within the ogival plug.

It is evident that in these applications the available room can be very limited and in certain cases insufficient to house the measuring organs of the conventional gauges.

It is therefore an object of the present invention to provide a gauge having measuring organs with limited bulk and weight.

Another object of the present invention is to provide a gauge particularly fit for measuring internal dimensions of a small value.

A further object of the invention is to provide gauges particularly fitted for being housed within protection ogival plugs to carry out several measurements on the same piece.

A still further object is to provide a gauge of limited cost, for both manufacturing and servicing.

These and other objects and advantages of the invention are achieved by a gauge with electrical position transducers to gauge the sizes of mechanical pieces including mobile feeling means adopted to contact the piece to be gauged, the feeling means being associated with connecting means adopted to displace mobile elements of the transducers to generate signals responsive to the position of the feeling means. The mobile element of every transducer is operated by an inextensible axially moving wire, an end of said wire being connected with an element associated to the feeling means and movable with them, the transducer generating an output signal responsive to the axial position of the wire. According to a particular embodiment of the present invention, a feeling and connecting means includes feelers fixed on a flexible lamina which can be deformed elastically with a point of which said wire is directly connected, the point being movable in the axial direction of the wire in consequence of the movement of the feelers.

The invention will be described in more detail by reference to the preferred embodiments illustrated in the attached drawings given by way of non-limiting example in which.

Figure 1:
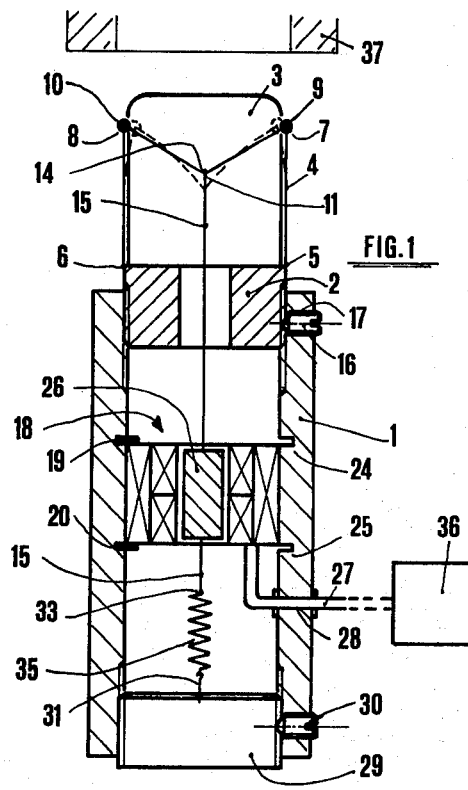
FIG. 1 represents a sectional side view of an inside gauge made according to the present invention.

With reference to FIG. 1, there is marked by 1 a hollow cylindrical body, threaded internally at the two ends, forming the frame of the gauge. A cylindrical element 2, threaded externally, is screwed to one end of body 1.

In element 2 there is for some height a longitudinal diametral notching so that two projections are obtained having two flat parallel walls inwards. In the Figure one of these walls is marked by 3. That is, the notching or cut made in element 2 provides the room for housing lamina 4. Lamina 4 is therefore housed between two opposed part-bylindrical members or projections (walls 3), which constitute a lateral protection ogival plug for the lamina.

A metal lamina 4 with a M-shaped profile has the bases 5, 6 welded to the outer surface of element 2 at the points in which the notching ends and stretches between walls 3 supplying a lateral protection ogival plug for lamina 4.

Due to the elasticity of the lamina its upper corners 7, 8 can carry out small displacements parallel with walls 3 from the position of rest indicated by continuous lines to such positions as the one indicated by dashed lines.

At corners 7, 8 there are fixed two feelers 9, 10, projecting with respect to lamina 4. At central corner 11 there is fixed an end 14 of a metal wire 15 which stretches along the axis of cylindrical body 1.

A screw 16 screwed in a threaded hole 17 in body 1 has the task of keeping element 2 in the set position.

In cylinder 1 there is a differential transformer 18, locked by two resilient rings 19, 20 cooperating with two grooves 24, 25 of cylinder 1.

Wire 15 passes through an axial hole in element 2 and in correspondence with transformer 18 supports a metal cylinder 26 forming the core of the transformer.

The input and output leads 27 of transformer 18 come out of cylinder 1 through a hole 28. The lower end of cylinder 1 is closed by a threaded element 29 which can be locked in the desired position by screw 30 equal to screw 16 mentioned above.

On the inner face in a central position element 29 carries a hook 31. Another hook 33 is connected to the lower base of cylinder 26 by a section of wire 15. Between the two hooks 31 and 33 a spring 35 hangs, keeping wire 15 always under tension.

Leads 27 of the transformer are connected with a feeding and processing electric unit 36 visualizing the measure.

The device works as follows: when it is required to measure the diameter of the hole of a piece 37 the end of element 2 is inserted thereinto. Feelers 9, 10 coming into touch with the wall of the hole, are compelled to approach, thus causing the two external sections of the lamina to be bent inwards. The two internal sections, too, near them and converging in corner 11 are bent and displaced so that corner 11 moves downward by some amount with respect to cylinder 1.

Consequently wire 15 and core 26 move downward by this amount whereas spring 35 becoming shorter keeps wire 15 still under tension. The downward displcement of core 26 causes a variation of the fluxes linked with the secondary windings of transformer 18. The variation is detected by unit 36 supplying the value of the diameter of the hole responsive to the displacement of core 26 by a biunivocal ratio.

When piece 37 is removed, lamina 4 takes the position of rest again, overcoming the resistance of spring 35.

Before measuring a set of pieces a zero-setting on a master is carried out.

First of all a mechanical zero-setting is carried out by screwing or unscrewing the two elements 2, 29 until core 26 lies about in a central position with respect to transformer 18.

Then elements 2 and 29 are locked by screws 16, 30 and an electric zero-setting is effected by operating suitable potentiometric circuits of unit 36, until the (not shown) reading index is brought to zero.

Figure 2:
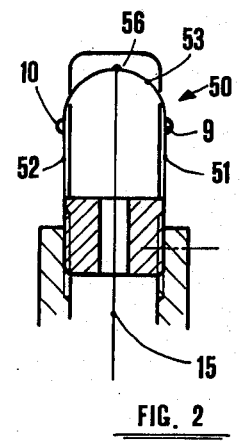
FIG. 2 represents a partial side view of a variant to the device of FIG. 1.

A variant to this gauge is illustrated in FIG. 2 where a lamina 50 is represented having a profile with the shape of an inverted U, made up of two straight sections 51 and 52 connected by a semicircular section 53.

At the top of the straight sections the two feelers 9, 10 are fixed, whereas wire 15 is welded on the top 56 of the semicircular section.

All other parts of the gauge are unchanged and its operation, too, is quite analogous, except that lamina 50 is bent, when the two feelers 9 and 10 during the measurement are pushed inwardly, so that the top 56 of the circular section moves upward.

Therefore in this case spring 35 becomes longer and not shorter and core 26, which moves upwardly brings about in the secondary windings of transformer 18 variations in the flux opposite the former variations.

This has to be taken into account when connecting transformer 18 with unit 36.

The two embodiments described up-to-now are particularly fitted for measuring small diameters, and the second for measuring very small diameters, even smaller than 2 mm, with an accuracy of thousandths of mm.

Figure 3:
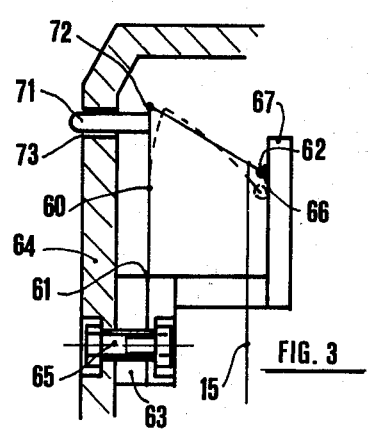
FIG. 3 is a partial sectional view of a measuring device according to another embodiment of the present invention.

In the gauge of FIG. 3 an end 61 of an elastic lamina 60 formed by two straight sections is welded on a support 63.

Support 63 is connected with the wall of an ogival plug 64 by bolts 65.

The other end 62 of lamina 60 supporting a roundish body 66 can slide on a flat wall 67 of support 63 parallel with the axis of ogival plug 64.

A feeler 71 welded on the lamina near corner 72 and projecting outside through an opening 73 in plug 64 is pushed inwards by the piece being measured and causes the free end 62 of lamina 60 to slide down.

Wire 15 is connected with the lamina near its end 62 and therefore follows the movement of the latter, when it moves down sliding on wall 67.

Besides wire 15, there are the same elements as considered already with reference to FIG. 1, i.e. essentially differential transformer 18, metal core 26 and spring 35.

These elements are in a suitable protecting shell which is fixed to the wall or to the base of the ogival plug.

Figure 4:
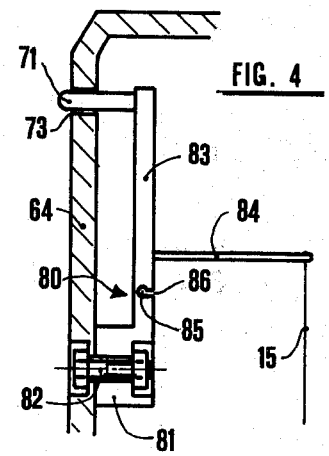
FIG. 4 is a partial sectional view of a measuring device according to a further embodiment of the present invention.

FIG. 4 illustrates a further embodiment of the invention. In this case the displacement is transmitted from feeler 71 to wire 15 by means of rigid arms pivotable around a fulcrum 80.

A support 81 fixed to the wall of ogival plug 64 through bolts 82 is fitted with an arm 83 with which feeler 71 is integral. At right angle towards the center of the ogival plug arm 83 carries a rod 84 to the end of which wire 15 is fixed.

Between rod 84 and support 81 a very thin section is obtained on arm 83 through a hole 85 and a notching 86.

This section is very flexible and elastic and forms the fulcrum 80 around which arm 83 and rod 84 can undergo small pivoting movements when feeler 71 is pushed inwards.

As in the former device, together with wire 15 there are a metal core, a spring and a differential transformer.

These last embodiments are illustrated in FIGS. 3 and 4 and are particularly useful when the measuring device must be endowed with several feelers arranged in a protection ogival plug. As a matter of fact in this case the room inside the plug must be used to the utmost. To transmit the movement of the feelers to the transducers by wires instead of by more encumbering systems of levers or arms presents several advantages.

Figure 5:
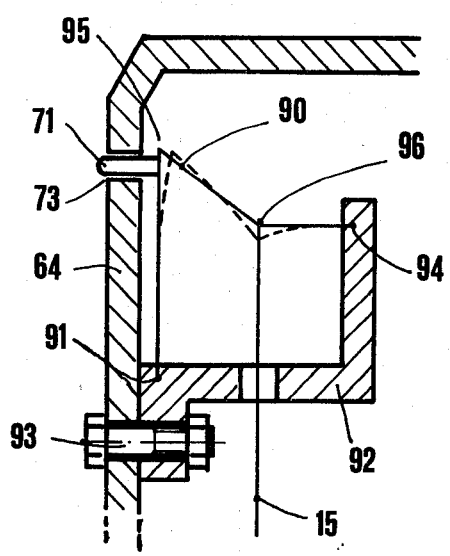
FIG. 5 is a partial sectional view of a variant to the device of FIG. 3.

A variant to the gauge of FIG. 3 is illustrated in FIG. 5. One end 91 of an elastic lamina 90 is welded to a support 92. Support 92 is fixed to ogival plug 64 by bolts 93.

Lamina 90 in the rest position is bent so as to achieve three straight sections and its other end 94 is welded to one part of support 92 stretching towards the inside of the plug.

A first straight section of the lamina reaches from end 91 to a corner 95 and supports feeler 71 in proximity to said corner. A second and a third straight section stretch towards the inside of ogival plug 64 as far as support 92. The two last straight sections form a corner 96 with which one end of the wire 15 is connected.

In this case, too, when feeler 71 is pushed into the plug by the piece to be measured elastic lamina 90 is deformed and consequently corner 96 and wire 15 connected with it are moved downwardly. As in other cases, this movement is detected by unit 36.

Figure 6:
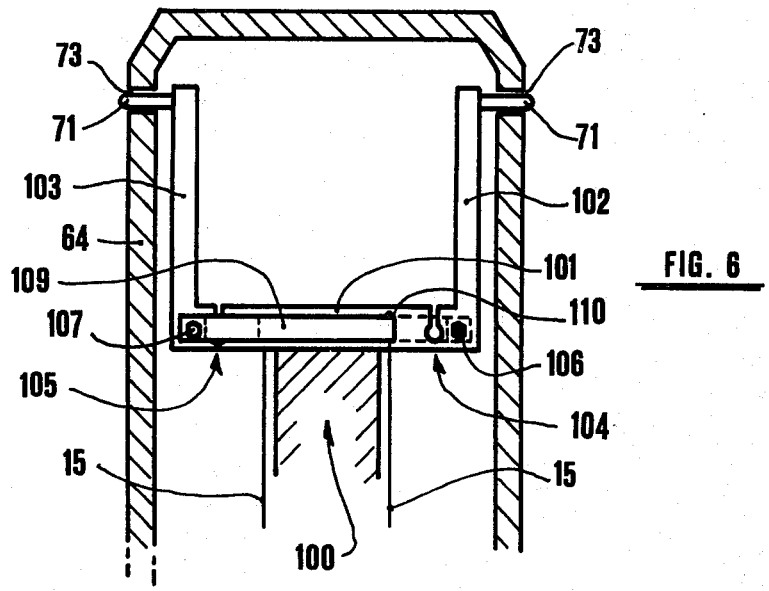
FIG. 6 is a partial sectional view of a variant to the device of FIG. 4.

FIG. 6 represents a variant to the gauge illustrated in FIG. 4. A support 100, fixed with regard to ogival plug 64, supports a transverse arm 101 with the ends of which two arms 102 and 103 are integral, the arms stretching parallel with the axis of plug 64.

In the sections included between support 100 and arms 102 and 103 arm 101 has two fulcra 104 and 105 similar to fulcrum 80 of FIG. 4. Two rods 109 are connected with arms 102 and 103 by means of bolts 106 and 107. The rods are arranged at opposite sides with respect to arm 101 and parallel with it.

With the two ends 110 of rods 109 there are connected two wires 15, which are connected in turn to two electric measuring transducers of the already mentioned type.

At the upper ends arms 102 and 103 support two feelers 71 projecting from ogival plug 64 through two openings 73.

When the plug is inserted into a hole to be gauged the two feelers 71, approaching, cause arms 102 and 103 to pivot around fulcra 104 and 105. Rods 109, integral with the arms, follow this pivoting movement and therefore both ends of them are moved downwardly.

Accordingly wires 15 are moved downwardly and therefore the relevant transducers supply two electric signals whose sum, carried out in unit 36 by an advisable adder, is adapted to represent the value of the diameter of the piece.

It should be noted that, in an analogous way, also for the embodiments illustrated in FIGS. 3, 4, 5 it is possible through suitable circuits included in unit 36 to process the signals coming from the different measuring transducers relevant to the various feelers so as to obtain signals representative of the diameters to be measured and of other sizes and geometrical features of the workpieces.

In the formerly described simple and multiple gauges wires 15 connected with feeling means directly support the mobile elements of transducers 18, i.e. cores 26.

In some applications, the main feature of the invention being unchanged, that is the transmission of the motion from the feeling means to the mobile elements of the transducers by means of inextensible axially movable wires, it may be advisable to arrange further connecting means such as rigid transmissions or the like between said wires and the moving elements. In this case the moving elements of the transducers can be supported in a per se known way.

What is claimed is:

1. A gauge for measuring the internal size of a bored mechanical workpiece comprising:
    a frame;
    feeler-carrying-means including: two opposed elastically deformable elongated lamina sections, each fixed at one end to said frame and extending in an axial direction thereof, said lamina sections being elastically deformable in a radial direction of the frame; and a transversal lamina section connecting two other ends of said opposed lamina sections, a point of said transversal lamina section being movable in the axial direction of the frame upon elastical deformation of said two opposed lamina sections in the radial direction;
    a first and a second feeler fixed at said other ends of the two lamina sections to be movable in the radial direction of the frame, for contacting the workpiece to be measured; and
    a position transducer including a movable element coupled to said point of the transversal lamina section to be movable therewith and detecting means carried by said frame to provide a signal depending on the position of said movable element.

2. The gauge according to claim 1, further comprising a protection plug coupled to said frame, said protection plug defining an internal room for housing said feeler-carrying-means and openings for the passage of said first and second feeler, the protection plug being adapted to be inserted into the bore of the workpiece to be measured.

3. The gauge according to claim 1, wherein said opposed lamina sections and transversal lamina section define an elastically deformable lamina having, in the rest position, a substantially M-shaped profile, and wherein the ends of the base of the M are fixed on said frame and the central corner of the M defines said point movable in the axial direction of the frame.

4. The gauge according to claim 1, wherein said opposed lamina sections and transversal lamina section define an elastically deformable lamina having, in the rest position, a profile substantially of an inverted U, and wherein the ends of the U are fixed on said frame, the vertix of the U defines said point movable in the axial direction of the frame and said first and second feeler are fastened on the sides of the U.

5. A gauge for measuring the internal size of a bored mechanical workpiece comprising:
    a frame;
    a protection plug fixed to said frame; feeler-carrying-means including: two opposed, elastically deformable, elongated lamina sections, each section having one end fixed with respect to said protection plug, and extending in an axial direction of the protection plug, said sections being elastically deformable in a radial direction of the plug; and a transversal lamina section connecting two other ends of said opposed lamina sections, a point of said transversal lamina section being movable in the axial direction of the frame upon elastical deformation of said two lamina sections in the radial direction; a first and a second feeler fixed at said other ends of the two lamina sections, to be movable in the radial direction of the plug, for contacting the workpiece to be measured; and
    a position transducer including a wire having an end connected to said point of the transversal section, a moving element coupled to the wire, means for maintaining the wire under tension and in an axial direction with respect to said plug, and detecting means adapted to provide a signal responsive to the workpiece size depending on the axial position of said wire and moving element.

6. A guage for measuring the internal size of a bored workpiece, comprising:
    a protection plug adapted to be inserted into the bore of the workpiece, said plug defining openings for permitting the measurement; support means coupled to said protection plug; at least a measuring device coupled to said support means and housed inside said protection plug, the
    measuring device including: an elastically deformable lamina comprised of a first section and a second section, the first section being elongated in an axial direction of said plug and having a first end fixed to said support means and a second end facing one of said openings and movable in a radial direction of said plug upon elastic deformation of the first section, the second section extending generally in a transversal direction of said plug and having a first end fixed to said second end of the first section and a second end cooperating with said support means, the second section defining a point movable in an axial direction of said plug upon elastic deformation of the first and second section; the measuring device further including: a feeler fixed to said second end of the first section to project outside said plug, through said opening, to contact the workpiece to be measured; and a position transducer comprised of a movable element coupled to said point defined by the second section to be movable with the same, and of detecting means coupled to said support means for providing a signal responsive to the position of said movable element and the workpiece size.

7. The gauge according to claim 6, wherein said position transducer further comprises a wire for coupling said movable element to said point defined by the second section of the lamina, and means for maintaining the wire under tension in an axial direction of the plug.

* * * * *